United States Patent
Kawase et al.

(10) Patent No.: US 9,915,345 B2
(45) Date of Patent: Mar. 13, 2018

(54) PISTON ASSEMBLY

(71) Applicant: HONDA MOTOR CO., LTD., Tokyo (JP)

(72) Inventors: Naokazu Kawase, Wako (JP); Hajime Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/725,786

(22) Filed: Oct. 5, 2017

(65) Prior Publication Data
US 2018/0038484 A1    Feb. 8, 2018

Related U.S. Application Data

(63) Continuation of application No. 15/334,362, filed on Oct. 26, 2016.

(30) Foreign Application Priority Data

Dec. 25, 2015  (JP) .................................. 2015-253302

(51) Int. Cl.
*F16J 9/20* (2006.01)

(52) U.S. Cl.
CPC .................... *F16J 9/206* (2013.01)

(58) Field of Classification Search
CPC ................. F16J 9/203; F16J 9/206; F16J 9/20
See application file for complete search history.

(56) References Cited

U.S. PATENT DOCUMENTS

| | | | |
|---|---|---|---|
| 2,213,452 A | 9/1940 | Paton | |
| 2,231,801 A * | 2/1941 | Cords | ........................ F16J 9/20 277/447 |
| 2,311,728 A | 2/1943 | Bowers | |
| 2,999,728 A | 9/1961 | Estey | |
| 2004/0061291 A1 | 4/2004 | Takiguchi et al. | |
| 2013/0328274 A1 | 12/2013 | Sugiura et al. | |
| 2015/0184748 A1 * | 7/2015 | Sytsma | .................... F16J 9/064 277/310 |
| 2016/0076649 A1 | 3/2016 | Fukuma et al. | |

FOREIGN PATENT DOCUMENTS

| | | |
|---|---|---|
| EP | 0069175 A1 | 1/1983 |
| JP | 2003194222 A | 7/2003 |

* cited by examiner

*Primary Examiner* — Kristina R Fulton
*Assistant Examiner* — L. Susmitha Koneru
(74) *Attorney, Agent, or Firm* — Armstrong Teasdale LLP (57) ABSTRACT

Provided is an oil ring (13) for a piston assembly that can minimize the frictional resistance without impairing the oil control function such as the scraping of lubricating oil from the cylinder wall surface by the oil ring. The oil ring consists of an upper side rail (16), a lower side rail (17) and an annular expander (18) interposed between the two side rails, and is received in an oil ring groove (8) with a prescribed vertical clearance (20) that permits tilting of the side rails. An outer peripheral surface (16E, 17E) of each side rail is provided with a radially inward slant. Therefore, during the upward stroke of the piston, the upper side rail tilts in the radially outward direction so that the effective slant angle of the outer peripheral surface of the upper side ring is adjusted to an optimum value.

11 Claims, 8 Drawing Sheets

PISTON ASSEMBLY

CROSS-REFERENCE TO RELATED APPLICATIONS

This application is a Continuation of U.S. patent application Ser. No. 15/334,362, filed Oct. 26, 2016, which claims the benefit of priority to Japanese Patent Application No. 2015-253302, filed Dec. 25, 2015, the entire contents of which are hereby expressly incorporated by reference in their entirety.

TECHNICAL FIELD

The present invention relates to an oil ring for a piston of a reciprocating machine such as an internal combustion engine, and in particular to a composite oil ring including a pair of side rails and an expander interposed between the two side rails and a piston assembly having such an oil ring.

BACKGROUND ART

The oil ring used in the pistons of conventional reciprocating internal combustions typically consists of a three piece oil ring including a pair of annular side rails positioned one above the other and a space expander interposed between the two side rails. See JP2003-194222A, for instance.

In recent years, there has been an increasing desire to reduce the frictional resistance between the oil ring and the associated cylinder wall surface in view of improving fuel economy. The frictional resistance may be reduced by decreasing the pressure exerted on the cylinder wall surface by the oil ring, but it may impair the oil control function of the oil ring such as the scraping of the lubricating oil off the cylinder wall surface. Therefore, the pressure of the oil ring on the cylinder wall surface cannot be reduced beyond a certain limit.

BRIEF SUMMARY OF THE INVENTION

In view of such problems of the prior art, a primary object of the present invention is to provide an oil ring that can minimize the frictional resistance without impairing the oil control function such as the scraping of lubricating oil from the cylinder wall surface by the oil ring.

To accomplish such objects, the present invention provides an oil ring (13) configured to be received in an oil ring groove (8) formed in an outer circumferential surface of a piston (4), comprising an upper side rail (16) and a lower side rail (17) each consisting of an annular plate member; and an annular expander (18) interposed between the upper side rail and the lower side rail such that the upper side rail, the lower side rail and the expander are disposed in a coaxial relationship; wherein an outer peripheral surface (16E) of the upper side rail includes a slanted surface with a radially inward slant (such that an upper part thereof recedes more radially inward than a lower part thereof) slanting by a first slant angle ($\theta 1$) with respect to an axial line of the piston; and wherein an outer peripheral surface of the lower side rail includes a slanted surface with a radially inward slant (such that an upper part thereof recedes more radially inward than a lower part thereof), slanting by a second slant angle ($\theta 2$) smaller than the first slant angle with respect to the axial line.

In this arrangement, because the outer peripheral surface of the upper side rail is slanted by the first slant angle $\theta 1$ and the outer peripheral surface of the lower side rail is slanted by the second slant angle $\theta 2$, during the upward stroke of the piston, each side rail is subjected to a lift that moves the side rail away from the cylinder wall surface owing to a relatively thick buildup of lubricating oil between the outer peripheral surface of the side rail and the cylinder wall surface. Thereby, the lubricating oil is not excessively scraped off the cylinder wall by the oil ring, and hence the shear resistance of the lubricating oil can be reduced. Meanwhile, during the downward stroke of the piston, because very little wedge effect is produced between the outer peripheral surfaces of the two side rails and the cylinder wall surface, the lubricating oil is scraped off the cylinder wall surface in an effective manner and the thickness of the oil film is appropriately controlled. During the upward stroke of the piston, owing to the presence of a clearance between the oil ring and the oil ring groove and the compressive deformation of the expander, the upper side rail tilts radially outward (the inner peripheral part thereof is raised in comparison with the outer peripheral part thereof). Therefore, during the upward stroke of the piston, the effective slant angle of the outer peripheral surface is reduced from the first slant angle by this tilting action. However, according to the present invention, because the first slant angle is originally greater than the second slant angle, this tilting action causes the actual slant angle of the outer peripheral surface of the upper side rail to be reduced from the first slant angle to a value closer to the second slant angle. Therefore, both the upper and lower side rails are allowed to engage the cylinder wall surface with an optimum slant angle which may be approximately equal to the second slant angle.

According to a preferred embodiment of the present invention, a clearance (20) is defined between an upper wall surface of the oil ring groove and the upper end surface of the upper side rail such that the upper side rail can tilt in a radially outward direction by a prescribed tilt angle during an upward stroke of the piston.

Thus, the tilt angle that is caused during the upward stroke of the piston can be accurately controlled by determining the size of the clearance and the resiliency of the expander.

The first slant angle is greater than the tilt angle preferably by 0.5 degrees to 4.5 degrees, and more preferably by 1.0 degree to 3.0 degrees. The first slant angle is between 2.5 degrees and 10.5 degrees, and more preferably between 4.0 degrees and 7.5 degrees. The second slant angle is preferably between 0.5 degrees and 4.5 degrees, and more preferably between 1.0 degree and 3.0 degrees. The tilt angle is preferably between 2.0 degrees and 6.0 degrees.

Preferably, the outer peripheral surface of the upper side rail is connected to a lower end surface thereof via a smooth curve (16G), and the outer peripheral surface of the lower side rail is connected to a lower end surface thereof via a smooth curve (17G).

In a particularly preferred embodiment of the present invention, the outer peripheral surface of the upper side rail is provided with a barrel shape having a vertically intermediate part thereof bulging radially outward, and the outer peripheral surface of the lower side rail is provided with a barrel shape having a vertically intermediate part thereof bulging radially outward.

An oil ring configured as discussed above can minimize frictional resistance without impairing the function to control the oil film thickness.

DETAILED DESCRIPTION OF THE PREFERRED EMBODIMENT(S)

An oil ring embodying the present invention is described in the following with reference to FIG. 1.

Figure 1:
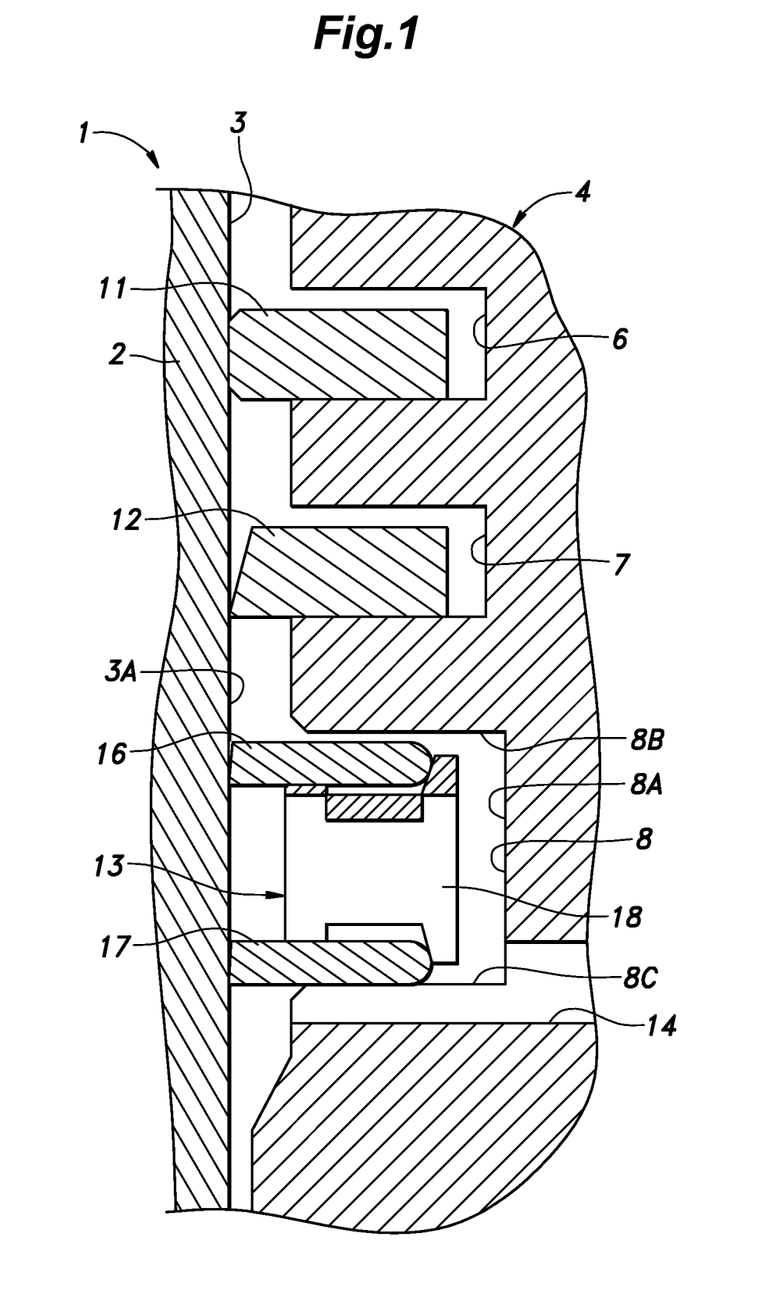
FIG. 1 is a sectional view of a piston fitted with an oil ring embodying the present invention.

As shown in FIG. 1, a cylinder block 2 of an internal combustion engine 1 is provided with a cylinder 3 having a circular cross section and extending along a prescribed axial line (which is assumed to be extending vertically for the convenience of description), and a piston 4 is slidably received in the cylinder 3. A combustion chamber is defined by an upper part of the cylinder 3, the top surface of the piston 4 and a cylinder head not shown in the drawing. The outer peripheral part of the piston 4 is formed with a first ring groove 6, a second ring groove 7 and a third ring groove 8, in that order from the top. Each of these ring grooves is annular in shape. The first ring groove 6 and the second ring groove 7 receive a first pressure ring 11 and a second pressure ring 12, respectively, and the third ring groove 8 receives an oil ring 13.

The third ring groove 8 includes a bottom surface 8A defined by a circumferential surface centered around the axial line of the piston 4 and having a prescribed vertical width (in the axial direction of the piston 4), an annular upper wall surface 8B extending radially outward from the upper edge of the bottom surface 8A and an annular lower wall surface 8C extending radially outward from the lower edge of the bottom surface 8A. The upper wall surface 8B and the lower wall surface 8C are both defined by planes that are perpendicular to the axial line of the piston 4. Thus, the third ring groove 8 has a rectangular cross section. An oil ejection passage 14 extends from the corner part defined between the lower wall surface 8C and the bottom surface 8A of the third ring groove 8 to the back or inner side of the piston 4.

In the illustrated embodiment, the internal combustion engine 1 consists of an automotive engine. The diameter of the cylinder 3 may be in the range of 68 mm to 92 mm, and the stroke of the piston 4 may be in the range of 60 mm to 100 mm.

Figure 2:
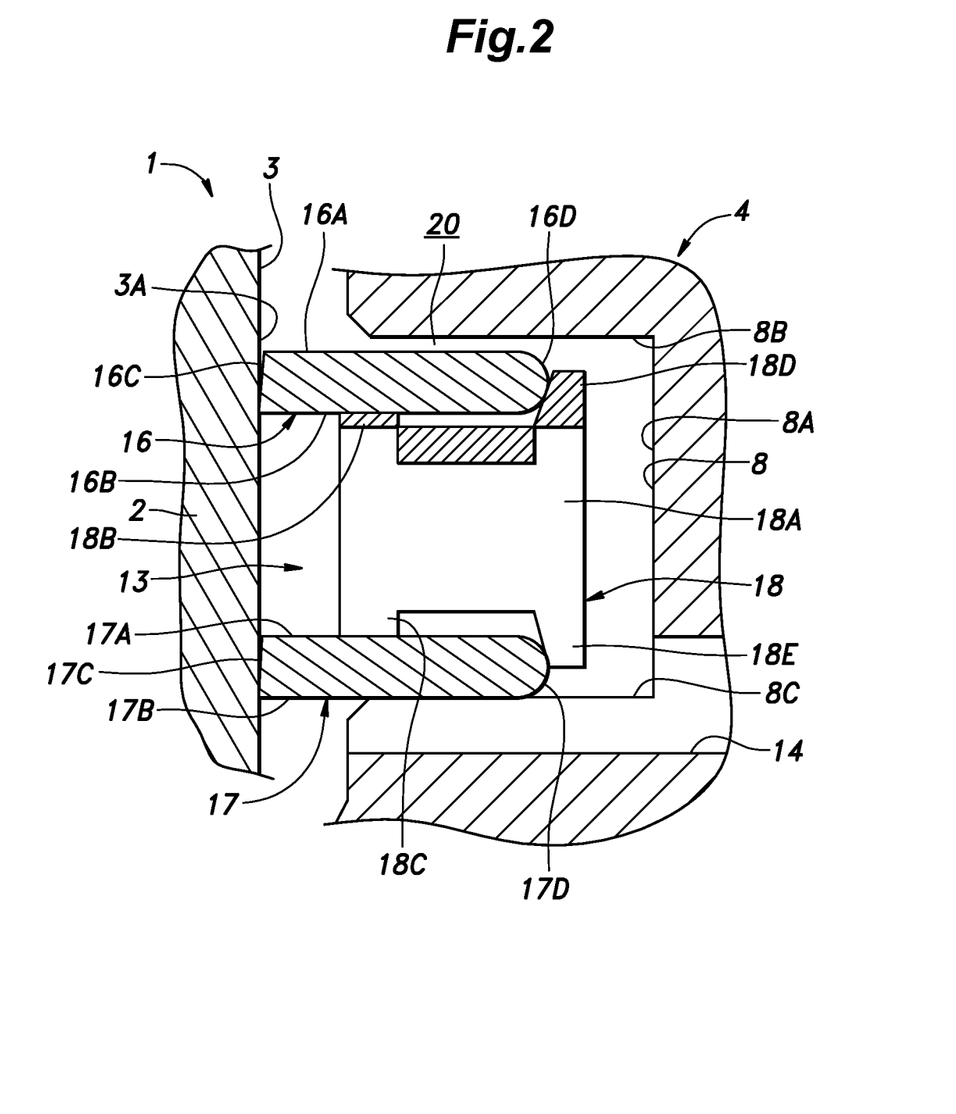
FIG. 2 is a cross sectional view of the oil ring.

As shown in FIGS. 1 and 2, the oil ring 13 consists of a three-piece oil ring including an upper side rail 16, a lower side rail 17 and an expander (space expander) 18 interposed between the upper side rail and the lower side rail 17.

As shown in FIG. 2, the expander 18 includes an annular expander main body 18A which is made of sheet metal, and is provided with a wavy shape as it extends along the circumferential direction. The main body is provided with a circumferential end gap therein. The wavy shape of the expander main body 18A is thus defined by upper projecting parts 18B and lower projecting parts 18C created by bending the sheet metal material of the expander main body 18A in an alternating manner along the circumferential direction. Each upper projecting part 18B is provided with an upper ear portion 18D projecting upward from a radially inner part of the upper surface thereof, and each lower projecting part 18C is provided with a lower ear portion 18E projecting downward from a radially inner part of the lower surface thereof. Thus, the upper ear portions 18D jointly define a radially outwardly facing shoulder surface forming an obtuse angle with respect to the upper surface of the upper projecting parts 18B, and the lower ear portions 18E jointly define a radially outwardly facing shoulder surface forming an obtuse angle with respect to the lower surface of the lower projecting parts 18C.

The side rails 16 and 17 are generally planar annular members each defining an upper end surface 16A, 17A and a lower end surface 16B, 17B that are in parallel to each other, and an outer peripheral surface 16C, 17C and an inner peripheral surface 16D, 17D which are concentric to each other.

Figure 3A:
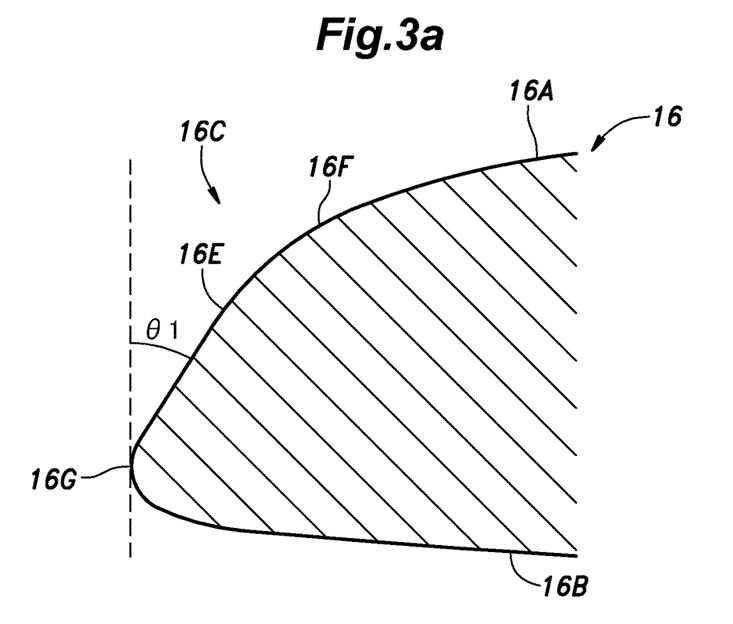
FIG. 3a is an enlarged cross sectional view of an upper side rail of the oil ring with different lateral and vertical magnification factors (the lateral dimension being five times more enlarged than the vertical dimension)
Figure 3B:
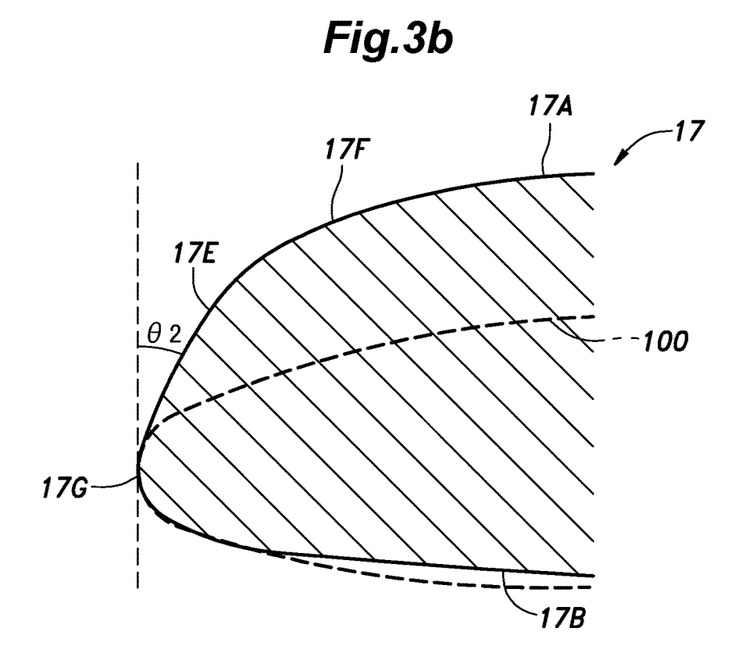
FIG. 3b is an enlarged cross section view of a lower side rail of the oil ring with different lateral and vertical magnification factors (the lateral dimension being five times more enlarged than the vertical dimension)

FIG. 3a is an enlarged cross sectional view of an outer peripheral part of the upper side rail 16 of the oil ring 13, and FIG. 3b is an enlarged cross sectional view of an outer peripheral part of the lower side rail 17 of the oil ring 13. In each of these drawings, the lateral and vertical dimensions are enlarged with different magnification factors; i.e., the lateral dimension is five times more enlarged than the vertical dimension. In each of these side rails 16 and 17, a major outer peripheral surface 16E, 17E which is located in a vertically intermediate part of the outer peripheral surface of the corresponding side rail 16, 17 is slanted with respect to the axial line in a radially inward direction or in such manner that the upper part of the major outer peripheral surface 16E, 17E recedes away from the opposing cylinder wall surface or toward the central axial line of the cylinder 3 in comparison with the lower part of the major outer peripheral surface 16E, 17E. In other words, each major outer peripheral surface 16E, 17E defines the outer peripheral surface of a cone with an upward taper. The slant angle of the major outer peripheral surface 16E of the upper side rail 16 is defined as a first slant angle θ1, and the slant angle of the major outer peripheral surface 17E of the lower side rail 17 is defined as a second slant angle θ2. The outer peripheral surface 16C, 17C of each of the side rails 16 and 17 may be defined as a true conical surface or a conical surface with a barrel shaped bulge (where a vertically middle part protrudes radially outward as compared to an outer peripheral surface of a true cone as is the case with the illustrated embodiment). The first slant angle θ1 and the second slant angle θ2 may also be considered as the average values of the slant angles of various parts of the outer peripheral surfaces of the respective side rails 16 and 17.

In each side rail 16, 17, an upper outer peripheral surface 16F, 17F is defined as a curve (in the cross sectional view) that smoothly connects the corresponding major outer peripheral surface 16E, 17E with the corresponding upper end surface 16A, 17A. Similarly, in each side rail 16, 17, a lower outer peripheral surface 16G, 17G is defined as a curve (in the cross sectional view) that smoothly connects the corresponding major outer peripheral surface 16E, 17E with the corresponding lower end surface 16B, 17B. In each side rail 16, 17, the major outer peripheral surface 16E, 17E accounts for a much larger part of the outer peripheral surface 16C, 17C than the corresponding upper outer peripheral surface 16F, 17F and/or the corresponding lower outer peripheral surface 16G, 17G. Each upper outer peripheral surface 16F, 17F has a greater radius of curvature (in the cross sectional view of FIGS. 3a and 3b) than the corresponding lower outer peripheral surface 16G, 17G. If each major outer peripheral surface 16E, 17E is barrel shaped, and is hence provided with a radius of curvature, this radius of curvature is greater than that of the corresponding upper outer peripheral surface 16F, 17F.

The upper side rail 16 and the lower side rail 17 are shaped identically except for the different configurations of the outer peripheral surfaces 16C and 17C thereof.

As shown in FIG. 2, the upper side rail 16, the lower side rail 17 and the expander 18 are combined in a mutually coaxial relationship. The lower end surface 16B of the upper side rail 16 abuts the upper ends of the upper projecting parts 18B, and the inner peripheral surface 16D of the upper side rail 16 abuts the radially outward facing sides of the upper ear portions 18D. The upper end surface 17A of the lower side rail 17 abuts the lower ends of the lower projecting parts 18C, and the inner peripheral surface 17D of the lower side rail 17 abuts the radially outward facing sides of the lower ear portions 18E. In the initial condition of the oil ring 13, as shown in FIG. 2, the upper end surfaces 16A and 17A of the upper side rail 16 and the lower side rail 17 are substantially parallel to each other, and the vertical dimension (the distance between the upper end surface 16A of the upper side rail 16 and the lower end surface 17B of the lower side rail 17) of the oil ring 13 is at a minimum value. Alternatively, in the initial condition of the oil ring 13, the upper end surfaces 16A and 17A of the upper side rail 16 and the lower side rail 17 are provided with a radially outward slant and a radially inward slant, respectively. A vertical clearance 20 which is present between the oil ring 13 and the third ring groove 8 as will be discussed hereinafter is thus taken up equally by the tilting of the upper side rail 16 and the lower side rail 17 in the opposite directions in the initial condition of the oil ring 13.

As shown in FIG. 1, the oil ring 13 is fitted into the third ring groove 8 such that the upper end surface 16A of the upper side rail 16 opposes the upper wall surface 8B, and the lower end surface 17B of the lower side rail 17 opposes the lower wall surface 8C. The expander 18 is pre-stressed in a direction to expand in the radially outward direction so that the upper ear portions 18D press the inner peripheral surface 16D of the upper side rail 16 in the radially outward direction, and the lower ear portions 18E press the inner peripheral surface 17D of the lower side rail 17 in the radially outward direction. In other words, the expander 18 urges both the upper side rail 16 and the lower side rail 17 in the radially outward direction. Urged by the expander 18, the outer peripheral surfaces 16C and 17C of the upper side rail 16 and the lower side rail 17 abut the wall surface 3A of the cylinder 3. Under this condition, the upper and lower side rails 16 and 17 and the expander 18 are positioned in a coaxial relationship to the axial line of the cylinder 3 and the axial line of the piston 4.

The vertical dimension (the sum of the thicknesses of the upper side rail 16, the expander 18 and the lower side rail 17) of the oil ring 13 in the initial condition is smaller than the vertical dimension of the third ring groove 8 so that a prescribed vertical clearance (vertical gap) 20 is created between the oil ring 13 and the third ring groove 8 when the oil ring 13 is fitted in the third ring groove 8. Owing to this clearance 20, each side rail 16, 17 is enabled to tilt in such a manner that the outer peripheral part thereof is higher or lower than the inner peripheral part thereof. Even if the upper side rail 16 and the lower side rail 17 are tilted in the radially outward direction in the initial condition, and the clearance 20 may not be apparent, the following description applies substantially equally.

Figure 4:
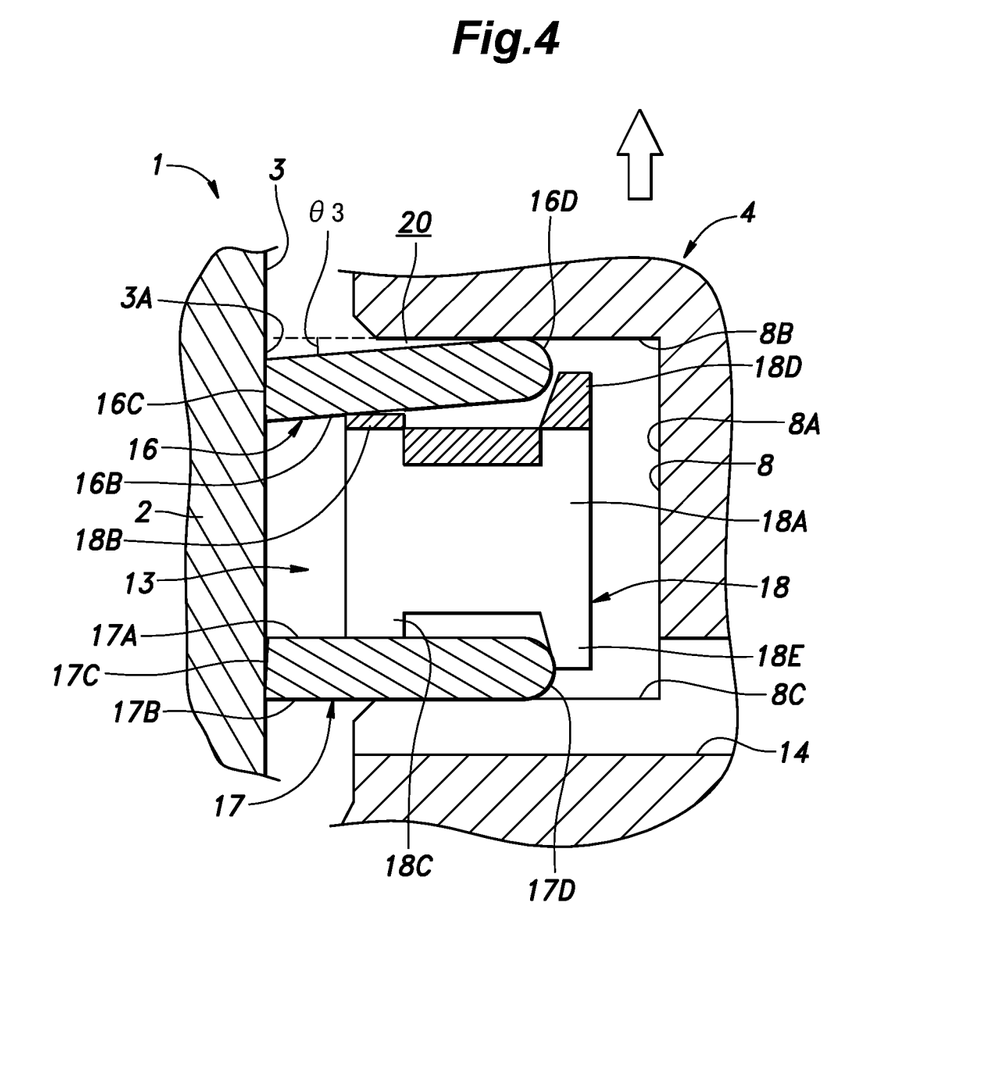
FIG. 4 is a view similar to FIG. 2 showing the state of the oil ring when the piston is moving upward.

As shown in FIG. 4, when the piston 4 moves upward in the cylinder 3 toward the top dead center, the side rails 16 and 17 are pushed downward by the lubricating oil interposed between the outer peripheral surfaces 16C and 17C of the side rails 16 and 17 and the opposing wall surface 3A of the cylinder 3. As a result, the lower end surface 17B of the lower side rail 17 makes a surface contact with the lower wall surface 8C, and the upper end surface 17A and the lower end surface 17B of the lower side rail 17 are placed in a horizontal state or extend perpendicularly to the axial line of the cylinder 3 (piston 4). Meanwhile, the expander 18 is pushed downward by the upper side rail 16 so that the lower projecting parts 18C are brought into contact with the upper end surface 17A of the lower side rail 17. The upper side rail 16 is caused to tilt radially outward such that the outer peripheral part thereof is lower than the inner peripheral part thereof owing to the presence of the clearance 20 between the upper wall surface 8B and the upper end surface 16A of the upper side rail 16. The angle defined between the upper end surface 16A of the upper side rail 16 and a plane perpendicular to the axial line of the cylinder 3 (piston 4) at this time is defined as a first tilt angle θ3.

Figure 5:
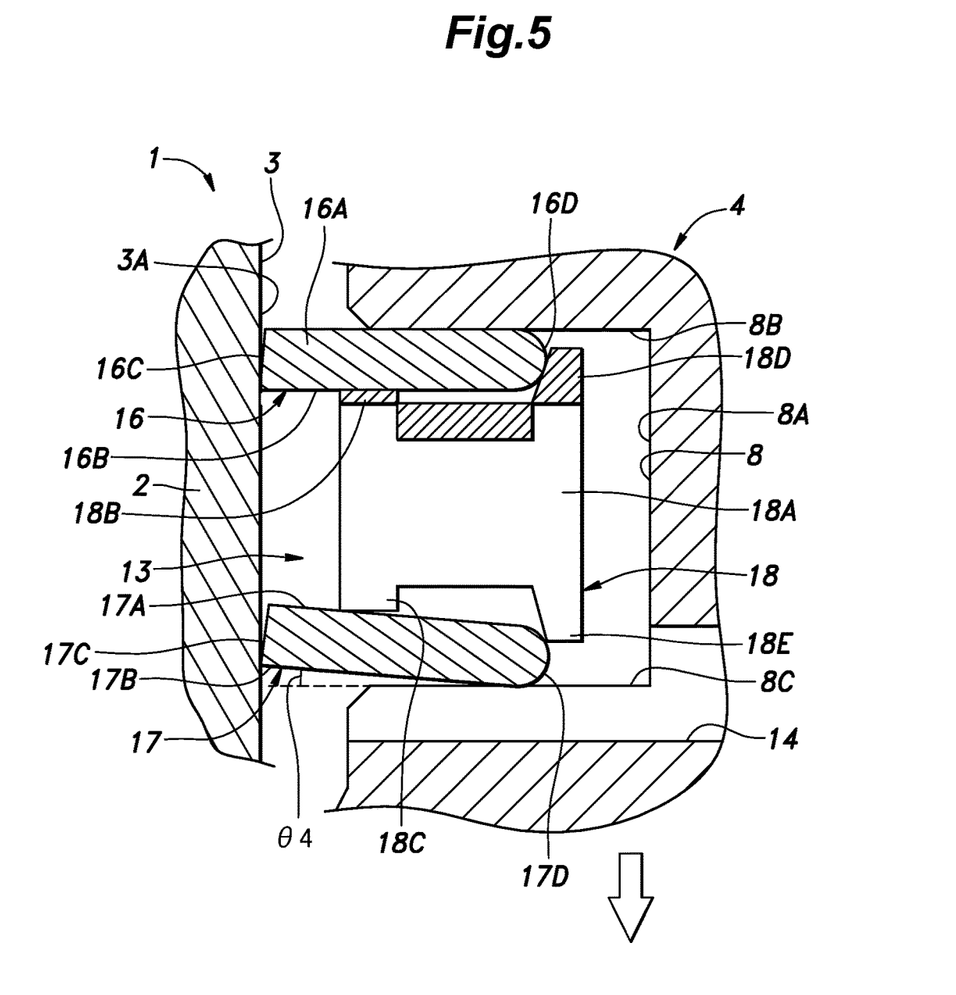
FIG. 5 is a view similar to FIG. 2 showing the state of the oil ring when the piston is moving downward.

As shown in FIG. 5, when the piston 4 moves downward in the cylinder 3 toward the bottom dead center, the side rails 16 and 17 are pushed upward by the lubricating oil interposed between the outer peripheral surfaces 16C and 17C of the side rails 16 and 17 and the opposing wall surface 3A of the cylinder 3. As a result, the upper end surface 16A of the upper side rail 16 makes a surface contact with the upper wall surface 8B, and the upper end surface 16A and the lower end surface 16B of the upper side rail 16 are placed in a horizontal state or extend perpendicularly to the axial line of the cylinder 3 (piston 4). Meanwhile, the expander 18 is pushed upward by the lower side rail 17 so that the upper projecting parts 18B are brought into contact with the lower end surface 16B of the upper side rail 16. The lower side rail 17 is caused to tilt such that the outer peripheral part thereof is higher than the inner peripheral part thereof owing to the presence of the clearance 20 between the lower wall surface 8C and the lower end surface 17B of the lower side rail 17. The angle defined between the lower end surface 17B of the lower side rail 17 and a plane perpendicular to the axial line of the cylinder 3 (piston 4) at this time is defined as a second tilt angle θ4.

The first tilt angle θ3 and the second tilt angle θ4 can be selected freely, and may be between 2.0 degrees and 6.0 degrees, for instance. More preferably, the first tilt angle θ3 and the second tilt angle θ4 may be between 2.0 degrees and 4.0 degrees. The first tilt angle θ3 and the second tilt angle θ4 can be adjusted by selecting the vertical dimensions of the upper side rail 16, the lower side rail 17 and/or the expander 18 for the given vertical dimension of the third ring groove 8, and/or the flexibility of the expander 18. The first tilt angle θ3 and the second tilt angle θ4 may be equal to each other, or may differ from each other. In the illustrated embodiment, the first tilt angle θ3 and the second tilt angle θ4 are both 2.5 degrees.

The first slant angle θ1 may be greater than the second slant angle θ2 (Condition 1). The first slant angle θ1 may be greater than the first tilt angle θ3 (Condition 2). When Conditions 1 and 2 are met, during the upward stroke of the piston 4, even though the upper side rail 16 tilts radially outward by the first tilt angle θ3, the angle defined between the major outer peripheral surface 16E of the upper side rail 16 and the wall surface 3A of the cylinder 3 is still greater than zero.

The first slant angle θ1 may be preferably greater than the first tilt angle θ3 by an angle between 0.5 degrees and 4.5 degrees (Condition 3). More preferably, the first slant angle θ1 may be greater than the first tilt angle θ3 by an angle between 1.0 degree and 3.0 degrees. When all of Conditions 1 to 3 are met, it is particularly preferable if the first slant angle θ1 is between 2.5 degrees and 10.5 degrees (Condition 4), and the second slant angle θ2 is between 0.5 degrees and 4.5 degrees (Condition 5). More preferably, the first slant angle θ1 may be between 4.0 degrees and 7.5 degrees, and the second slant angle θ2 may be between 1.0 degree and 3.0 degrees.

Figure 6A:
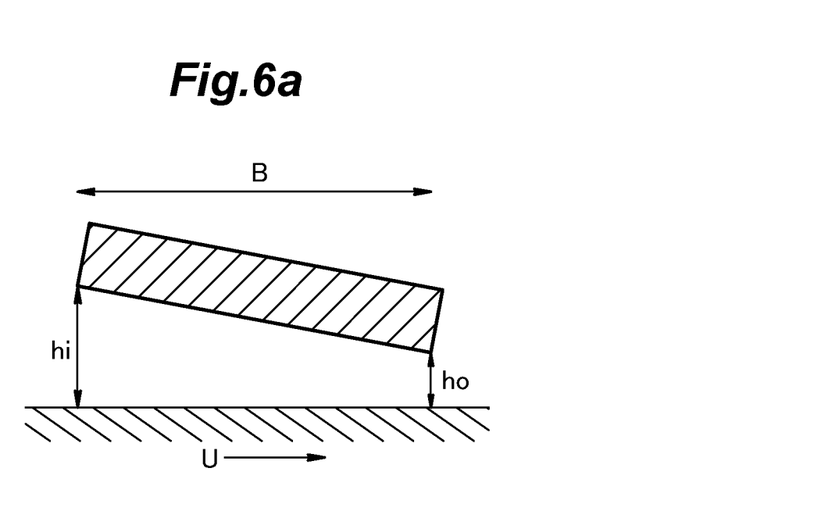
FIG. 6a is a diagram illustrating a planar pad moving over a planar surface at a speed U.
Figure 6B:
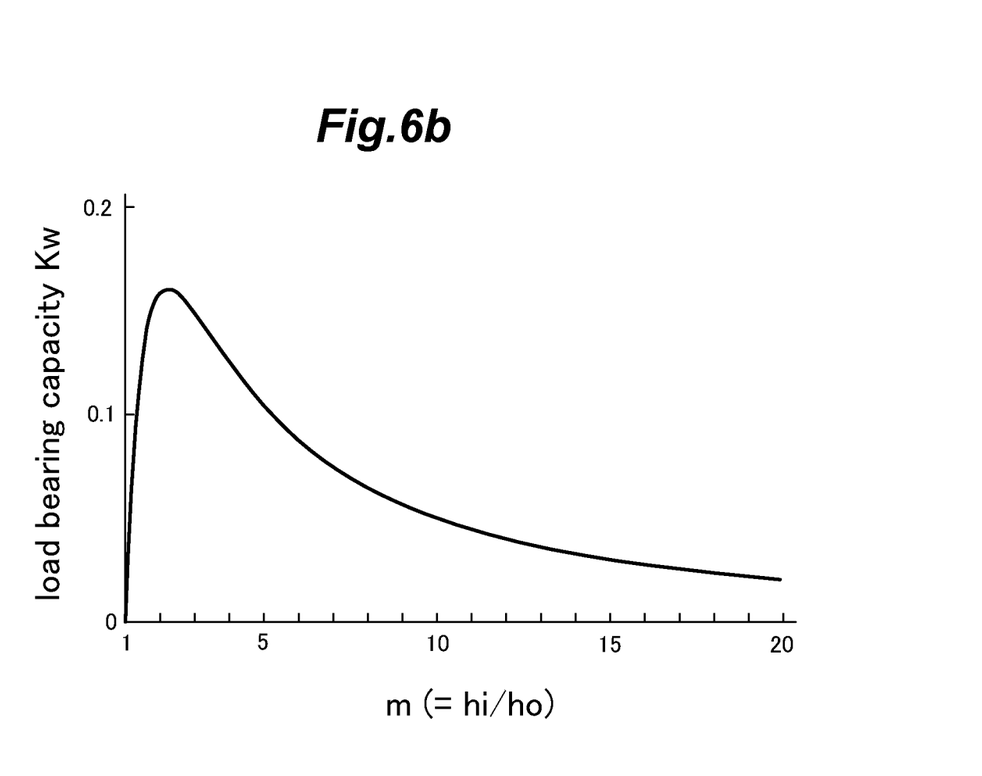
FIG. 6b is a graph showing the relationship between the load bearing capacity and a parameter m representing the angle of the planar pad relative to the planar surface.

In a thrust bearing, the load bearing capacity coefficient Kw for an infinite plane pad having a width D and moving at a relative velocity of U can be expressed by the following equation.

$$Kw = \frac{6}{(m-1)^2}\left[\ln m - \frac{2(m-1)}{m+1}\right] \quad (1)$$

where m (=hi/ho) is a parameter representing the slanting of the pad. hi is the thickness of the oil film at the inlet of the pad, and ho is the thickness (minimum oil film thickness) of the oil film at the outlet of the pad as shown in FIG. 6a. The load bearing capacity coefficient Kw represents the wedge effect (lift) for a unit surface area, and is known to take a maximum value when m is about 2.2 and decrease in value with an increase in the slant angle of the pad as shown in FIG. 6b. When the vertical width (thickness) of the side rails 16 and 17 is 500 μm, and ho is 3 μm under a normal rpm condition of the internal combustion engine 1, m=2.2 can be achieved by setting the slant angle to about 0.4 degrees. Therefore, the angle between the main part of the outer peripheral surface 16C, 17C of each of the upper and lower side rails 16 and 17 and the wall surface 3A of the cylinder 3 during the upward stroke of the piston 4 is preferably 0.5 degrees or more. By noting the fact that the load bearing capacity coefficient Kw decreases sharply with the decrease in the value of m when m is less than 2.2, a margin of 0.1 degrees may be allowed for the optimum angle of 0.4 degrees. Also, in view of variations in the configurations of the upper and lower side rails 16 and 17, and variations in the operating condition of the engine, a margin of 0.5 degrees may be allowed for the optimum angle of 0.4 degrees so that the angle between the main part of the outer peripheral surface 16C, 17C of each of the upper and lower side rails 16 and 17 and the wall surface 3A of the cylinder 3 during the upward stroke of the piston 4 may be preferably 1.0 degree or greater.

It can be appreciated from the graph of FIG. 6b that m is desired to be less than 15 to increase the lift owing to the wedge effect. When the vertical dimension (thickness) of each side rail 16, 17 is 500 μm, and ho in the normal rpm range of the internal combustion engine 1 is 3 μm, m is 15 when the slant angle is about 4.8 degrees. Therefore, the angle between the main part of the outer peripheral surface 16C, 17C of each of the upper and lower side rails 16 and 17 and the wall surface 3A of the cylinder 3 during the upward stroke of the piston 4 is preferably 4.5 degrees or less. To further increase the lift owing to the wedge effect, the angle between the main part of the outer peripheral surface 16C, 17C of each of the upper and lower side rails 16 and 17 and the wall surface 3A of the cylinder 3 during the upward stroke of the piston 4 is preferably 3.0 degrees or less.

In the oil ring 13 of the illustrated embodiment, because the major outer peripheral surface 16E, 17E of each side rail 16, 17 is given with the first slant angle θ1 or the second slant angle θ2, during the upward stroke of the piston 4, the major outer peripheral surface 16E, 17E is slanted with respect to the wall surface 3A of the cylinder 3, and the resulting wedge effect causes a lift that pushes the side rail 16, 17 away from the wall surface 3A of the cylinder 3. Therefore, the scraping of the lubricating oil from the cylinder wall surface 3A by the side rail 16, 17 is made less active. Also, because the film thickness of the lubricating oil between the side rail 16, 17 and the wall surface 3A of the cylinder 3 is increased, the shear resistance of the lubricating oil is reduced, and the fuel economy is hence improved.

The upper side rail 16 tilts by the first tilt angle θ3 during the upward stroke of the piston 4. However, because the first slant angle θ1 is greater than the first tilt angle θ3, the major outer peripheral surface 16E of the upper side rail 16 is slanted with respect to the wall surface 3A of the cylinder 3 such that a lift owing to the wedge effect is applied to the upper side rail 16. When the first slant angle θ1 is between 2.5 degrees and 6.5 degrees, and the tilt angle is 2.0 degrees, the angle between the major outer peripheral surface 16E of the upper side rail 16 and the wall surface 3A of the cylinder 3 during the upward stroke of the piston 4 will be between 0.5 degrees and 4.5 degrees so that the upper side rail 16 receives a relatively large lift directed in the radially inward direction owing to the wedge effect. When the first slant angle θ1 is between 6.5 degrees and 10.5 degrees, and the tilt angle is 6.0 degrees, the angle between the major outer peripheral surface 16E of the upper side rail 16 and the wall surface 3A of the cylinder 3 during the upward stroke of the piston 4 will be between 0.5 degrees and 4.5 degrees. When the second slant angle θ2 is between 0.5 degree and 4.5 degrees, the angle between the major outer peripheral surface 17E of the lower side rail 17 and the wall surface 3A of the cylinder 3 during the upward stroke of the piston 4 will be between 0.5 degrees and 4.5 degrees so that the lower side rail 17 receives a relatively large lift directed in the radially inward direction owing to the wedge effect. When the second slant angle θ2 is between 1.0 degree and 3.0 degrees, the angle between the major outer peripheral surface 17E of the lower side rail 17 and the wall surface 3A of the cylinder 3 during the upward stroke of the piston 4 will be between 1.0 degree and 3.0 degrees.

The wedge effect produced in each side rail 16, 17 during the downward stroke of the piston 4 is small, and the distance between the side rail 16, 17 and the wall surface 3A of the cylinder 3 is kept small so that the lubricating oil on the wall surface 3A of the cylinder 3 is effectively scraped off, and a prescribed thickness of lubricating oil is maintained on the wall surface 3A of the cylinder 3.

Figure 7:
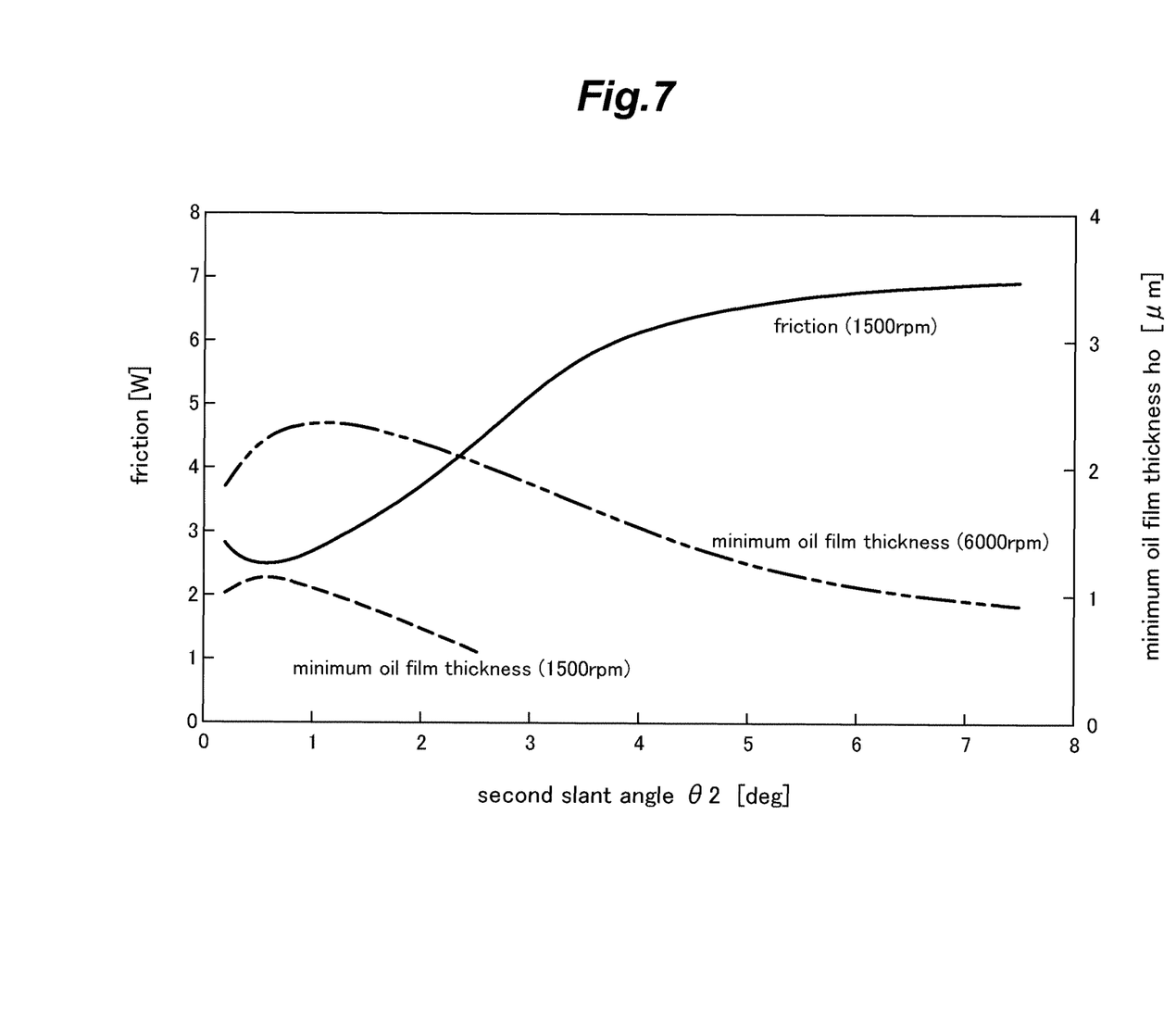
FIG. 7 is a graph showing the relationship between the friction force and the angle between the outer peripheral surface of the lower rail and the cylinder wall surface for two different oil film thicknesses.

FIG. 7 is a graph showing the frictional force associated with the lower side rail 17 and the minimum oil film thickness ho (the oil film thickness at the lower end (outlet) of the major outer peripheral surface 17E of the lower side rail 17) during the upward stroke of the piston 4 in relation with changes in the second slant angle θ2 of the lower side rail 17. This graph was obtained by experimental tests conducted under the condition where the diameter of the cylinder 3 is 73 mm, the stroke of the piston 4 is 78.7 mm, the tension of the oil ring 13 is 14.5 N, and the vertical dimension of the lower side rail 17 is 500 µm. The internal combustion engine 1 was operated at the rotational speeds of 1,500 rpm and 6,000 rpm. As can be appreciated from FIG. 7, when the engine rotational speed is 1,500 rpm, the minimum oil film thickness ho increases with an increase in the second slant angle θ2 when the second slant angle θ2 is smaller than about 0.7 degrees, and decreases with an increase in the second slant angle θ2 when the second slant angle θ2 is greater than about 0.7 degrees. Thus, when the engine rotational speed is 1,500 rpm, the friction is minimized when the second slant angle θ2 is about 0.7 degree where the minimum oil film thickness ho attains the maximum value, and increases thereafter with an increase in the second slant angle θ2. Similarly, when the engine rotational speed is 6,000 rpm, the minimum oil film thickness ho increases with an increase in the second slant angle θ2 when the second slant angle θ2 is smaller than about 1.2 degrees, and decreases with an increase in the second slant angle θ2 when the second slant angle θ2 is greater than about 1.2 degrees. Thus, it can be concluded that setting the second slant angle θ2 to a relatively small value such as less than 4.0 degrees is beneficial in reducing the frictional resistance during the upward stroke of the piston 4.

Figure 8:
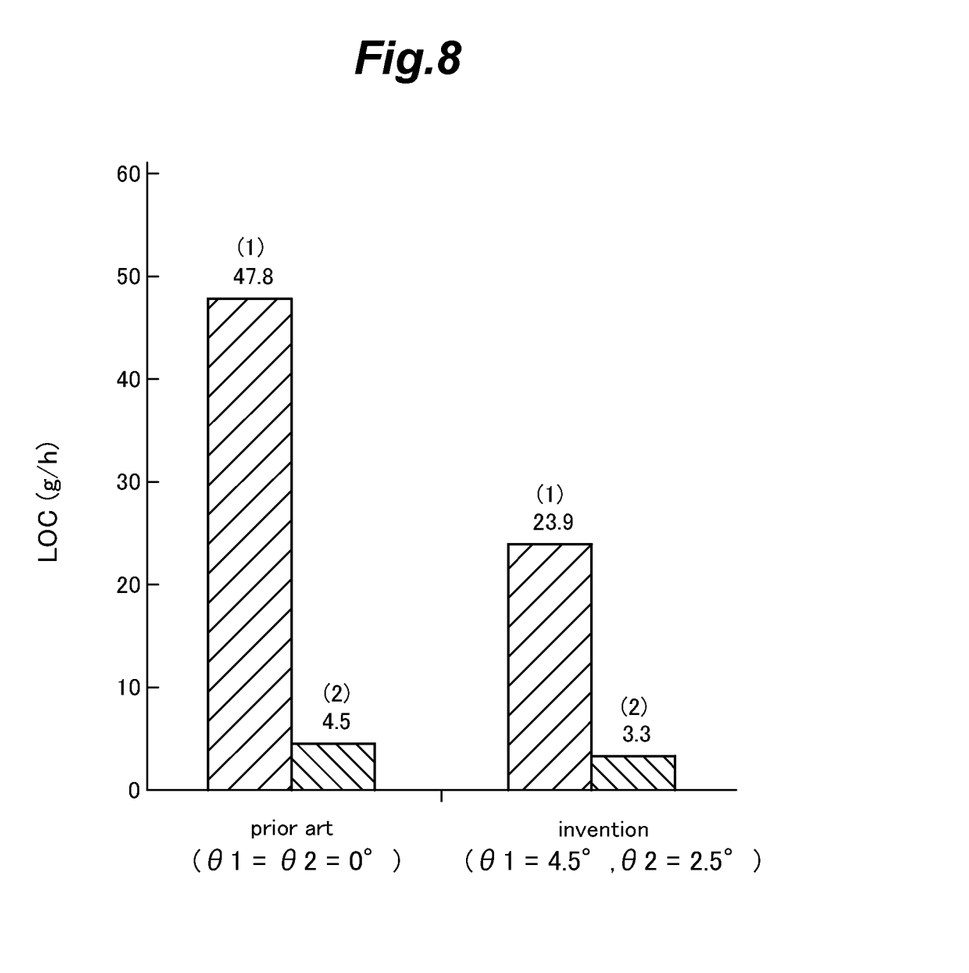
FIG. 8 is a graph comparing the lubricating consumptions of the present invention and the prior art.

FIG. 8 is a graph showing the influences of the shapes of the outer peripheral surfaces 16C and 17C of the side rails 16 and 17 on the consumption of lubricating oil. In particular, this graph compares the lubricating oil consumptions (LOC) when the oil ring 13 of the illustrated embodiment is used, and the lubricating oil consumptions (LOC) when a conventional oil ring is used. In regards to the oil ring 13 of the illustrated embodiment, the first slant angle θ1 of the upper side rail 16 was 4.5 degrees, the second slant angle θ2 of the lower side rail 17 was 2.5 degrees, and the tilt angle was 2.5 degrees. The vertical dimension of each side rail was 500 µm. The conventional oil ring is similar to the oil ring 13 of the illustrated embodiment except for in the configurations of the outer peripheral surfaces 16C and 17C of the upper and lower side rails 16 and 17. The upper and lower side rails of the conventional oil ring were identical to each other including the slant angles of the major outer peripheral parts thereof. As indicated by the broken lines 100 in FIG. 3b, the major outer peripheral surfaces 16E and 17E of the conventional oil ring were each given with a zero slant angle, and were each barrel shaped or have a vertical middle part that bulge out radially outward.

The internal combustion engine 1 was operated at the rotational speed of 6,800 rpm in Test (1), and at a low rpm that changes cyclically so as to simulate an engine brake condition in Test (2). In Test (1), the speed of the movement of the oil ring 13 was so fast that a relatively thick oil film was formed, and each side rail 16, 17 was significantly lifted away from the wall surface 3A of the cylinder 3. On the other hand in Test (2), the speed of the movement of the oil ring 13 was so slow that a relatively thin oil film was formed, and each side rail 16, 17 was substantially in contact with the wall surface 3A of the cylinder 3. Therefore, the lubricating oil consumption was significantly higher in Test (1) than in Test (2). In Test (2), the consumption of lubricating oil consumption was attributed largely to the fact that the throttle valve was substantially closed, and the negative pressure thereby created in the combustion chamber caused the lubricating oil to be drawn into the combustion chamber primarily via the end gap of the oil ring 13.

By comparing the results of Tests (1) and (2), it was confirmed that the oil ring 13 of the illustrated embodiment allows the lubricating oil consumption to be reduced as compared with the conventional oil ring. It is surmised that the oil ring 13 of the illustrated embodiment was effective in reducing the lubricating oil consumption in Test (1) because the oil ring 13 of the illustrated embodiment scrapes upward the lubricating oil on the wall surface 3A of the cylinder during an upward stroke of the piston 4 to a less extent than the convention oil ring. Also, it is surmised that the oil ring 13 of the illustrated embodiment was effective in reducing the lubricating oil consumption in Test (2) because the oil ring 13 of the illustrated embodiment prevents or minimizes the deposition of lubricating oil on top of the piston. Therefore, even when the negative pressure in the combustion chamber is significant as was the case in the condition of Test (2), the amount of lubricating oil drawn into the combustion chamber by the negative pressure was reduced, and the consumption of lubricating oil was minimized.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A piston assembly, comprising:
   a piston provided with an oil ring groove formed in an outer circumferential surface of the piston; and
   an oil ring received in the oil ring groove, the oil ring comprising:
     an upper side rail and a lower side rail each consisting of an annular plate member; and
     an annular expander interposed between the upper side rail and the lower side rail such that the upper side rail, the lower side rail and the expander are disposed in a coaxial relationship;
   wherein an outer peripheral surface of the upper side rail includes a slanted surface with a radially inward slant slanting by a first slant angle with respect to an axial line of the piston;
   wherein an outer peripheral surface of the lower side rail includes a slanted surface with a radially inward slant slanting by a second slant angle smaller than the first slant angle with respect to the axial line;
   wherein a clearance is defined between an upper wall surface of the oil ring groove and an upper end surface of the upper side rail such that the upper side rail can tilt in a radially outward direction by a prescribed tilt angle during an upward stroke of the piston;
   wherein the first slant angle is an angle of the slanted surface of the outer peripheral surface of the upper side rail with respect to the axial line of the piston when the upper side rail is not tilting; and
   wherein the first slant angle is greater than the tilt angle.

2. The piston assembly according to claim 1, wherein the first slant angle is greater than the tilt angle by 0.5 degrees to 4.5 degrees.

3. The piston assembly according to claim 2, wherein the first slant angle is greater than the tilt angle by 1.0 degree to 3.0 degrees.

4. The piston assembly according to claim 2, wherein the first slant angle is between 2.5 degrees and 10.5 degrees.

5. The piston assembly according to claim 4, wherein the first slant angle is between 4.0 degrees and 7.5 degrees.

6. The piston assembly according to claim 2, wherein the second slant angle is between 0.5 degrees and 4.5 degrees.

7. The piston assembly according to claim 6, wherein the second slant angle is between 1.0 degree and 3.0 degrees.

8. The piston assembly according to claim 2, wherein the tilt angle is between 2.0 degrees and 6.0 degrees.

9. The piston assembly according to claim 8, wherein the tilt angle is between 2.0 degrees and 4.5 degrees.

10. The piston assembly according to claim 1, wherein the outer peripheral surface of the upper side rail is connected to a lower end surface thereof via a smooth curve, and the outer peripheral surface of the lower side rail is connected to a lower end surface thereof via a smooth curve.

11. The piston assembly according to claim 1, wherein the outer peripheral surface of the upper side rail is provided with a barrel shape having a vertically intermediate part thereof bulging radially outward, and the outer peripheral surface of the lower side rail is provided with a barrel shape having a vertically intermediate part thereof bulging radially outward.

* * * * *